United States Patent

[11] 3,587,178

| [72] | Inventor | Tsuneji Kojima |
| | | 65-2 Chome Higashi-Sigi-Machi, Kita-Ku, |
| | | Nagoya-shi, Japan |
| [21] | Appl. No. | 868,167 |
| [22] | Filed | Oct. 21, 1969 |
| [45] | Patented | June 28, 1971 |
| [32] | Priority | Aug. 20, 1969 |
| [33] | | Great Britain |
| [31] | | 41,640/69 |

[54] MEMORY-EXERCISING DEVICE
6 Claims, 10 Drawing Figs.

[52] U.S. Cl. ..................... 35/6, 46/145
[51] Int. Cl. ..................... G09b 13/02
[50] Field of Search ............ 35/5, 6, 35(B); 46/145, 146

[56] References Cited

UNITED STATES PATENTS

| 713,085 | 11/1902 | Flindall | 35/6 |
| 925,716 | 6/1909 | McAnulty | 35/6 |
| 2,855,700 | 10/1958 | Rock | 35/6 |

Primary Examiner—Jerome Schnall
Assistant Examiner—J. H. Wolff
Attorney—Browdy and Neimark ABSTRACT: A memory-exercising device including a keyboard with a plurality of pushbuttons each of which has an indicia thereon, each pushbutton being mechanically connected to an indicator plate containing an indicia thereon corresponding to the indicia on the pushbutton so that when a pushbutton is depressed the indicating plate swings upwardly so that the indicia thereon becomes exposed to view.

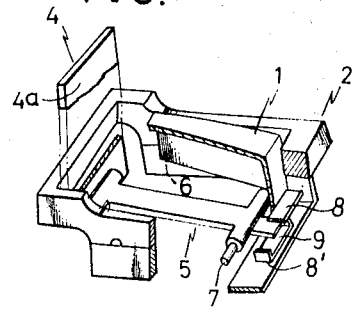
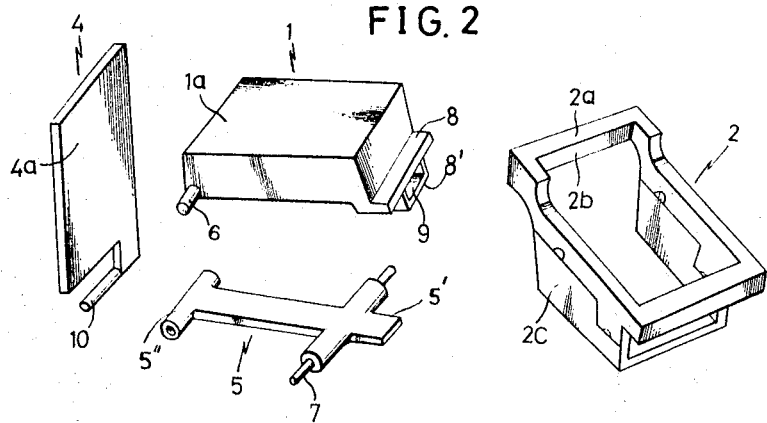

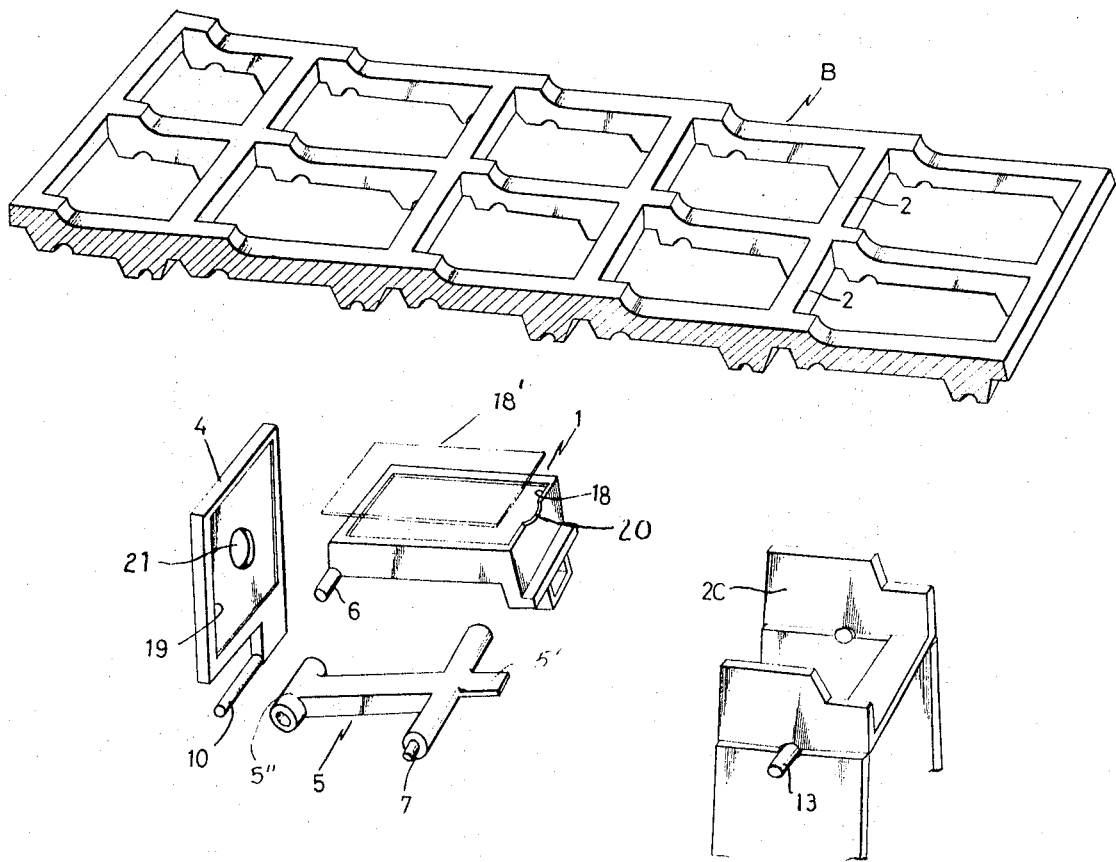

MEMORY-EXERCISING DEVICE

The present invention relates to a memory-exercising device suitable for use by students to learn the multiplication tables or the like using a simple device.

It is already known to use multiplication-exercising devices with the numbers to be multiplied located on the surface of a pedal and by pushing the pedal the product appears on the inside wall the pedals being ordinarily arranged as checkers in a machinery box, each of the checkers being capable of sinking via spring power when force is applied to the surface of a pedal by a finger in order that the product appear on the inside front wall on which the products are written.

This traditional memory-exercising device has numerous defects as it makes use of the inside front wall on which the product appears when a pedal is pushed down and the facade inside is not able to be large enough. Further, the keyboard like pedals are difficult to attach with constant flexibilities via spring power to push out without one of the pedals being sprung out of the keyboard. Fatigue deformation of the spring tends to cause the pedal to sink down to the bottom of the hole or to spring out of it, or for the spring itself at times to get out by fatigue deformation. Further, in order to keep the inside facade out for a while, it is required to keep pushing the pedal of the keyboard, such inconvenience in handling is inevitable.

The present invention has as an object to provide a device without the defects mentioned above.

The explanation will be given in detail in conjunction with the embodiment shown in the accompanying drawings in which:

FIG. 1 represents a perspective view partially cut away of the most fundamental and critical part of the present invention;

FIG. 2 shows perspective views of details of the invention illustrated in the FIG. 1;

FIG. 10 is a perspective view of an other embodiment of the frame structure.

Figure 3:
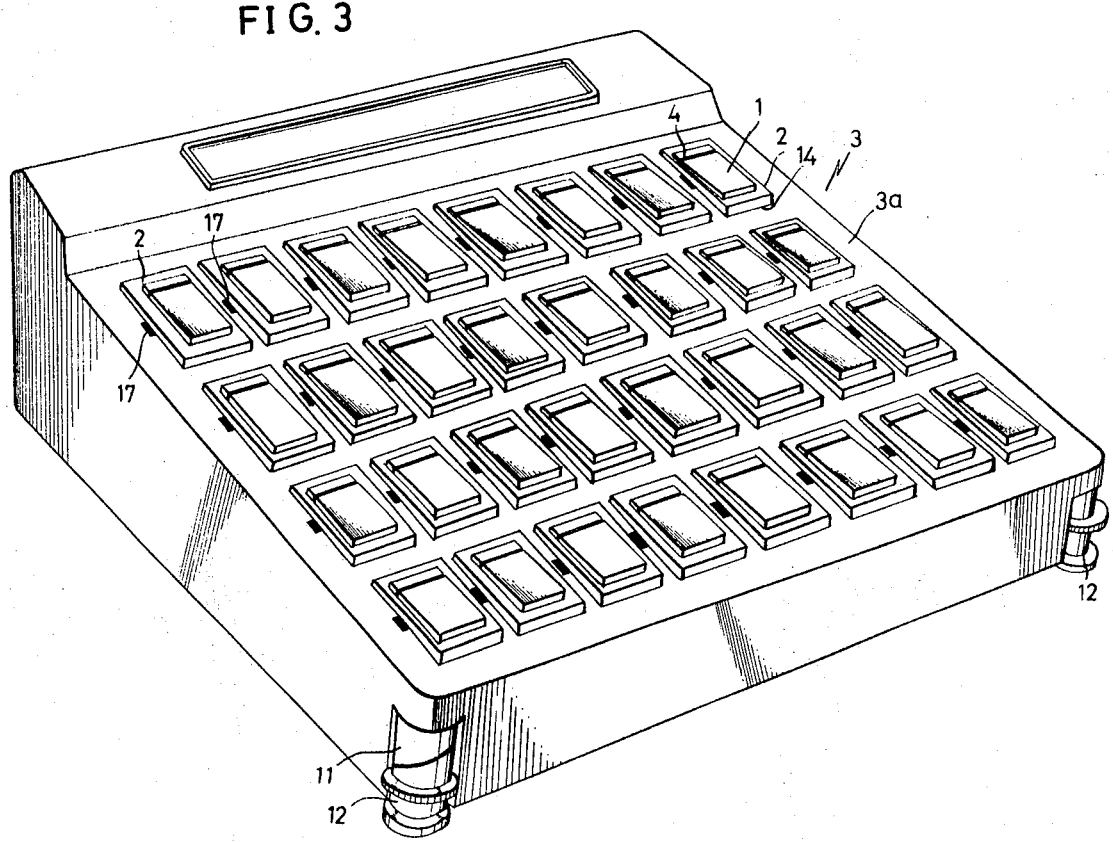
FIG. 3 is a perspective view of the whole of the memory-exercising device of the present invention.

Referring to the drawings, a subassembly is shown in FIG. 1 which includes a pushbutton 1 which is hingedly attached to a frame 2 which is placed into an opening of the top surface of a keyboard 3 of the outer frame 3a of the device as shown in FIG. 3. An indicating plate 4 is attached to a connecting mechanism or lever rod 5 so that as the pushbutton 1 is depressed the indicating plate 4 will pivot upwardly to become visible to the operator of the device extending upwardly above the top surface of the keyboard 3a to expose an indicia 4a appearing on the front face of the indicating plate 4. A corresponding indicia 1a appears on the top surface of the pushbutton 1.

The pushbutton 1 is pivotally attached near its rear end by hinge 6 to the frame 2 so that pressure on the front end of pushbutton 1 will cause it to pivot downwardly about the hinge 6, thereby activating movement upwardly of the indicating plate 4 through action of the connecting mechanism 5.

Figure 4:
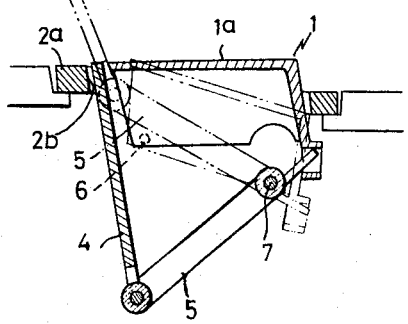
FIG. 4, FIG. 5 and FIG. 6 illustrate the functioning of the device.

The connecting mechanism 5, as shown in FIG. 2 is provided with a pivot shaft 7 extending outwardly from both sides of the mechanism into the frame 2. An extension 5' on connecting mechanism 5 extends forwardly from the position of the pivot shaft 7. The pushbutton 1 is provided at its front end with a forwardly extending upper and lower stop 8, 8'. The extension 5' of the connecting mechanism 5 extends between two stops 8, 8' and when the pushbutton 1 is depressed the upper stop moves the extension 5' downwardly from the solid position shown in FIGS. 4 and 5 to the dot-dash position.

The rear end 5" of the connecting mechanism 5 is connected to the indicating plate 4 by the shaft 10 at the lower end thereof. Thus as the extension 5' at the front of the connecting mechanism 5 is moved downwardly a relatively short distance, due to the location of the pivot shaft 7, the rear end 5" and the indicating plate 4 connected thereto moves a longer distance upwardly to the exposed position shown in the dot-dash lines of FIG. 4. Utilizing the gravity of the indicating plate 4 it will tend to return to its lowermost position thereby returning the pushbutton 1 to its original position.

The indicating plate 4 carries the indicia 4a on its front face which indicia contain the items to be memorized which correspond to the indicia 1a on the top surface of the pushbutton 1. The indicating plate 4 is made of thin metal. The upper part of the indicating plate 4 is adjacent to front face 2b of the rear frame 2a of the frame 2. When the pushbutton 1 is depressed the indicating plate 4 will move upwardly in the space between the rear edge of the pushbutton 1 and the rear frame 2a.

Figure 5:
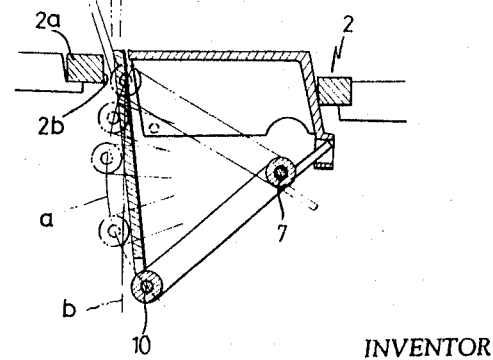

As shown in broken lines in FIG. 5, as the push button 1 is depressed the shaft 10 moves along the arcuate path (a) to its uppermost position which lies on the vertical line (b). Since the front face 2b of the rear frame 2a is located rearwardly of the vertical line (b), the plate 4 in its raised position leans rearwardly so that its rear surface rests on the rear frame 2a of the frame 2 as shown at (I) in FIG. 5. In this position, the friction of both parts prevents the plate 4 from returning by gravity to its lower position. The plate 4 can be easily restored to the lower position by a light pressure on the rear surface of the plate 4 to tilt it forwardly as shown by the arrow in FIG. 5.

Figure 6:
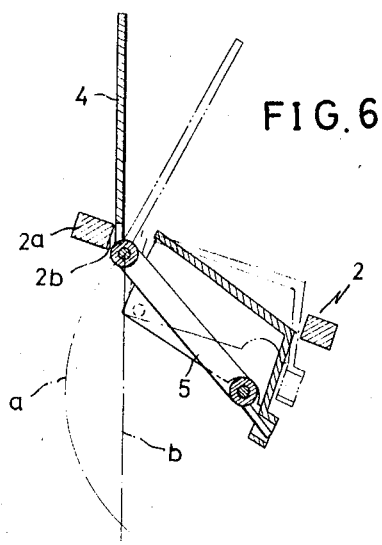

Thus, it can be seen that the frame will become locked in the upper exposed position when the vertical line (b) passing through the shaft 10 at the uppermost point of its travel is located forwardly of the front edge 2b of the rear frame 2a. However, if the frame 2 slopes downwardly toward the front as shown in FIG. 6, the plate will not lean backwardly against the rear frame 2a and accordingly upon release of the pushbutton 1 the plate immediately returns to the original position upon release of the pushbutton. The tilt of the frame 2 with respect to the vertical line (b) can be controlled by tilting the outer frame 3 which holds the frames 2. FIG. 3 shows the device for tilting the outer frame 3. A stationary cam 11 having a cam face at its lower end is provided above a leg 12. The upper face of the leg 12 is formed to fit the cam face of cam 11 so that by turning the leg 12 by suitable means, the leg 12 is urged up and down by the function of the cam. This tilting of the frame 2 with respect to the vertical line b is adjusted by adjustments of the legs 12 up and down so that all of the frames 2 on the keyboard will tilt at the same time.

Figure 8:
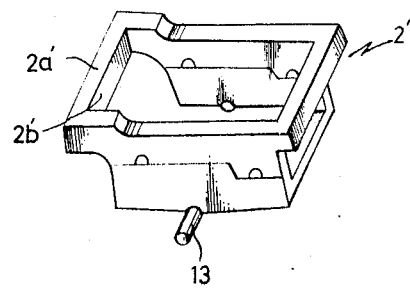
FIG. 8 is a perspective view of the frame of the keyboard of another embodiment of the invention.

In order to lock and release the movement of pushbutton 1 and plate 4 individually, all of the frames 2 on the outer frame 3 are set so that they will tilt individually with respect to the outer frame 3. The frame 2' in FIG. 8 is provided for this purpose with a hinge 13 held by the outer frame 3 so that the frame 2' can pivot back and forth with respect to the outer frame 3. Thus, it is best to locate the hinge 13 nearer to the front end of frame 2' so that in its normal position the frame 2' is tilted to the rear. In this way the elevated plate 4 will immediately drop by lightly pressing down the front end of frame 2' and pivoting it forwardly about its hinge 13. Then, the plate 4 will move pivotally about hinge 10 and will drop downwardly. Further, the frame 2' will pivot rearwardly to its original position by releasing the pressure thereon and be in position ready for actuation of the pushbutton again.

A spring can be attached if desired to cause the frame 2' to tilt to the rear irrespective of the location of the pivot hinge 13. Thus the elevated plate 4 will drop back without the necessity of tilting the frame 2' to a degree so that the position of the rear frame 2' will become forward of the vertical line b. Further, the plate which is leaning against the rear frame 2a' will easily drop without a spring when the hinge 13 is provided mounted towards the front side so that the tilting tendency is toward the rear side as mentioned above and the frame 2a' is attached to the outer frame 3 with a clearance so that the frame 2a' can pivotally move back and forth.

Figure 9:
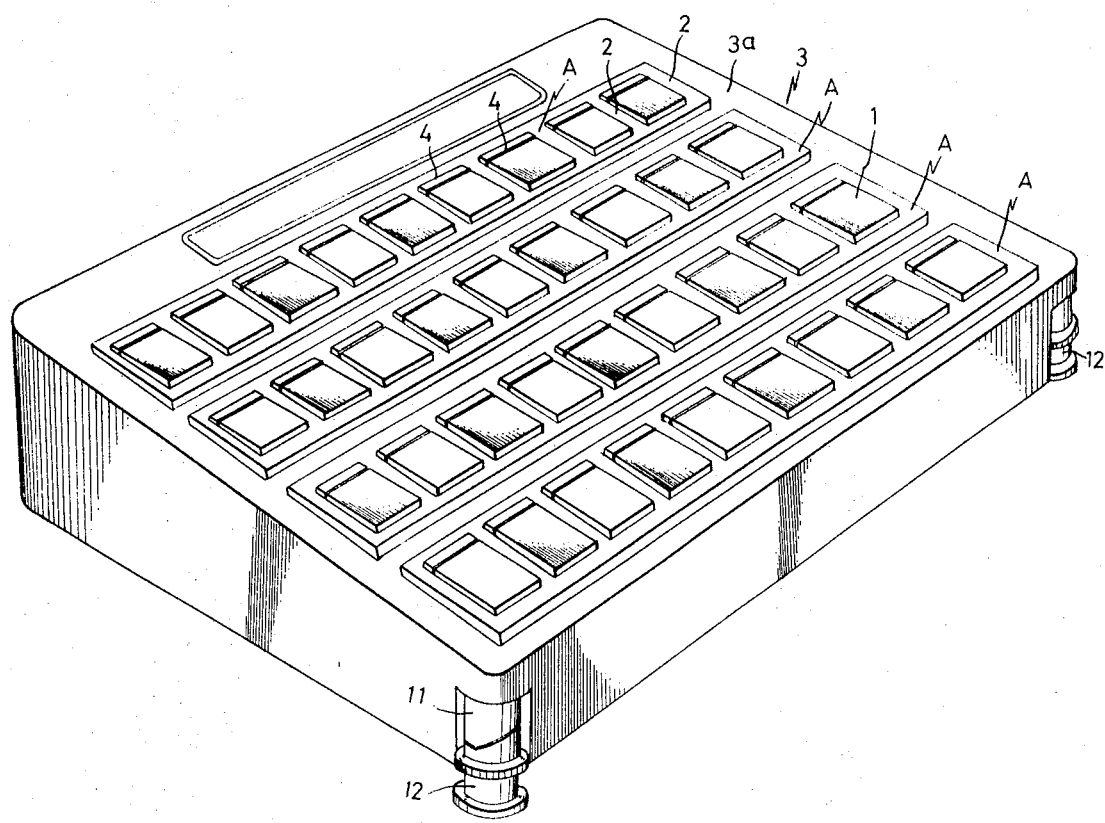
FIG. 9 is a perspective view of another embodiment of the keyboard.

As shown in FIG. 9, a group of frames 2 can be mounted together in a group frame A and the unified frames 2 will then tilt back and forth all together. In this construction the formation of frame 2 and its attachment to the keyboard 3a of the outer frame 3 is relatively simple, however, the locking and releasing of each plate 4 in its pushed-up position individually will not be possible.

Figure 7:
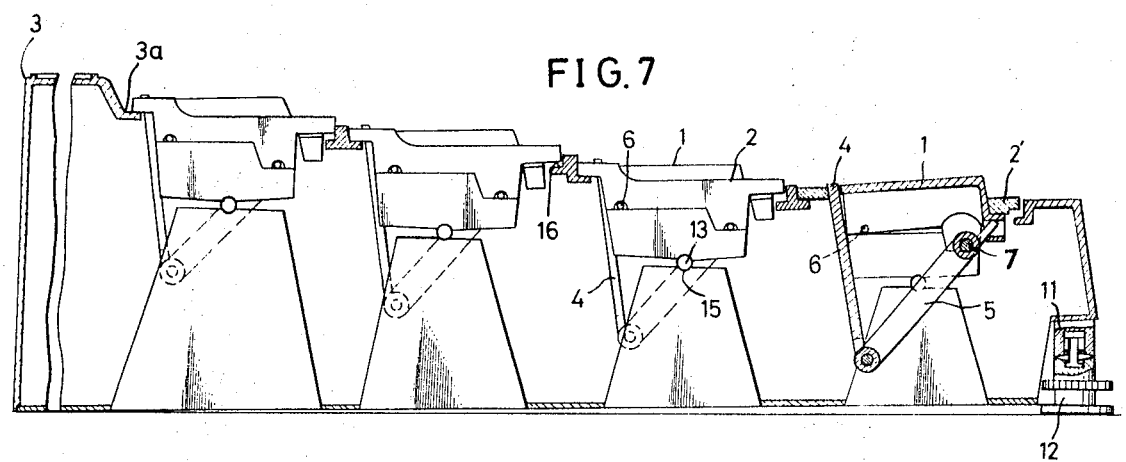
FIG. 7 is a cross-sectional view taken from front to back of FIG. 3.

When assembling the frame 2 to the outer frame 3, using the tilting motion of the frame 2 as shown in FIG. 7, each assembled unit as shown in FIG. 1 is inserted into an opening in the outer frame 3. In this case, it is advantageous to assemble all the frame 2 in one unified frame B as shown in FIG. 10, and then to attach the lower part 2c to a separately made frame and then to the outer frame 3.

When the frame 2 is to be attached to the outer frame 3 to enable the tilting motion, assembling is as follows:

In an opening 14 in the outer frame 3 a bearing portion 15 is formed and a holding step 16 in order to hold the frame 2 allowing the space for tilting back and forth of the frame 2. The frame 2 is then inserted into the opening 14 and it is fixed with suitable wedges 17 so that the frame 2 will not move from position.

The memory-exercising device described above can be used as an exercising machine for basic multiplication if the basic numbers to be multiplied are used as the indicia 1a of the pushbutton 1 and the product of the basic numbers is placed as the indicia 4a of each plate 4. It can also be used as a memory-exercising device for Chinese Letters-Ideograph if the picture or Japanese Letters-Syllabary are written as the indicia 1a of the pushbutton 1 and corresponding Chinese Character-Ideograph as the indicia 4a of the plate 4. It may also be used as a basic exercising device for a foreign language if the words in one language are written as the indicia 1a of the pushbutton 1 and the words in another language as the indicia 4a of the plate 4.

A single apparatus can be used in various ways for many purposes by making the indicia on plate 4 and pushbutton 1 changeable. FIG. 10 shows one such example. In FIG. 10 there is shown a protruded frame 18, protruded upward at the circumference of the face of pushbutton 1. The purpose of the protruded frame 18 is to permit the insertion in the frame of a separately made indicator 18' by pressing it downward into the protruded frame 18. The indicator can be made of any suitable material. Even a piece of paper may be used. An opening 20 can be provided center of the front portion of the pushbutton 1 for ease in removal of the indicator inserted in the pushbutton. Further, a protruded frame 19 is formed in the frame 4 to receive the indicator with the indicia thereon. An opening 21 is formed for ease in removal of the indicator.

In the memory-exercising device described above the plate 4 containing the items to be memorized will protrude from the keyboard by a light pressure on the pushbutton 1. Furthermore, the plate 4 will maintain its protruded position by leaning on the rear frame 2a of the frame 2. By lightly moving the plate 4 forwardly, or by touching the front portion of the frame 2 in that construction, the plate will be restored to its original position.

I claim:

1. A memory-exercising device comprising a keyboard provided with a plurality of pushbuttons having an indicia on their upper surfaces, each said pushbutton being mounted in a frame and being pivotally attached near its rear end to said frame so that it can be depressed by pressure on its front end, said frame having a rear frame element adjacent the rear end of said pushbutton, a lever rod being connected at its front end to said pushbutton, a plurality of indicating plates having indicia on their front surfaces, each said indicating plate being hingedly connected to the rear end of said lever rod so that when said pushbutton is in its initial lowered position with its upper edge substantially flush with the upper rear surface of said pushbutton between said pushbutton and the rear frame element, means pivoting said lever rod to said frame so that as said pushbutton is depressed at its front end it activates the front end of said lever rod downwardly about its pivot causing a magnified movement of the rear end of said lever rod upwardly thereby causing said indicating plate to move upwardly to a position where it is substantially exposed above said keyboard with its indicia exposed, the front end of said rear element being positioned rearwardly of the vertical line passing through the hinge of said indicating plate when at the upper limit of its travel.

2. A memory-exercising device according to claim 1 wherein the keyboard is mounted on an outer frame slanting downwardly to the front thereof and adjusting means at the front of said outer frame for adjusting the slant thereof.

3. A memory-exercising device according to claim 1 wherein a plurality of said frames is made in one piece as a group frame.

4. A memory-exercising device according to claim 1 wherein each frame is mounted onto the outer frame in such a manner as to pivot back and forth.

5. A memory-exercising device according to claim 3 wherein said group frame is mounted onto the outer frame in such a manner as to pivot back and forth.

6. A memory-exercising device according to claim 1 wherein said indicia on said pushbutton and said indicating plates are so mounted thereon that they can be readily changed.

UNITED STATES PATENT OFFICE
CERTIFICATE OF CORRECTION

Patent No. 3,587,178          Dated June 28, 1971

Inventor(s) Tsuneji KOJIMA

It is certified that error appears in the above-identified patent and that said Letters Patent are hereby corrected as shown below:

Col. 2, line 69, "2'" should be --2a'--

Col. 4, - Claim 1, line 20, after "initial" insert --raised position said indicating plate is in its initial--

Signed and sealed this 7th day of December 1971.

(SEAL)
Attest:

EDWARD M. FLETCHER, JR.      ROBERT GOTTSCHALK
Attesting Officer               Acting Commissioner of Patents